Patented Aug. 25, 1953

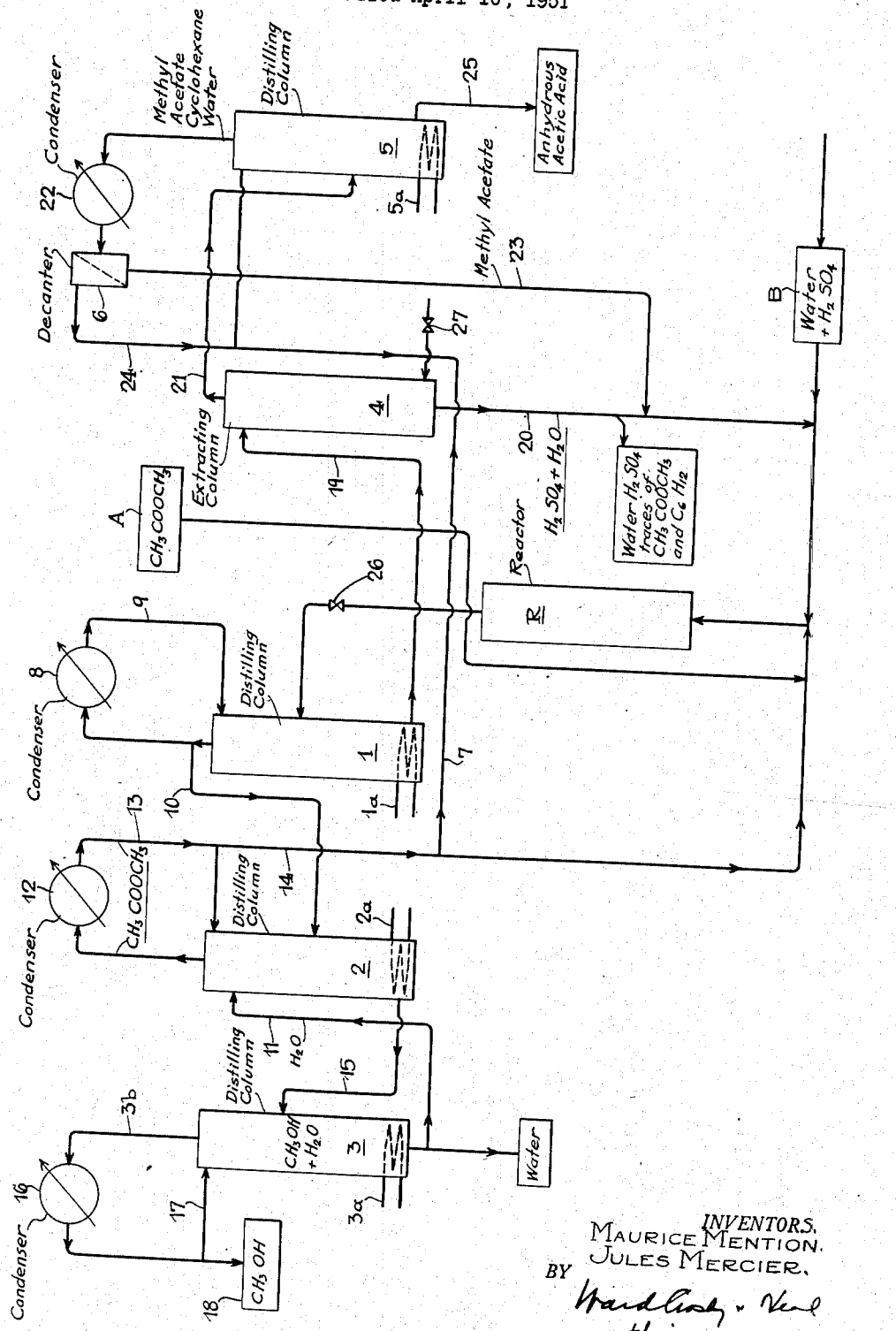

2,650,249

UNITED STATES PATENT OFFICE 2,650,249

PROCESS FOR TREATING METHYL ACETATE

Maurice Mention and Jules Mercier, Melle, France, assignors to Les Usines de Melle (Societe Anonyme), Saint-Leger-les-Melle, France, a corporation of France Application April 10, 1951, Serial No. 220,291
In France April 27, 1950

4 Claims. (Cl. 260—541)

This invention relates to the separation of mixtures of ester, water, and acid and alcohol, capable of forming such ester. More particularly it relates to the separation into their components of mixtures containing methyl acetate, methyl alcohol, acetic acid and aqueous mineral acid.

One of the sources for the mixture of components just mentioned results from the hydrolysis of methyl acetate which is a by-product in the manufacture of polyvinyl alcohol. Heretofore this methyl acetate so obtained has been saponified by means of sodium hydroxide with a later addition of a strong acid such as sulphuric acid in calculated amount to liberate the acetic acid, whereupon the methyl alcohol and acetic acid are separated by distillation. This method is somewhat complicated and expensive.

It is an object of this invention, accordingly, to provide a simple, efficient process for treating methyl acetate and recovering methyl alcohol and acetic acid.

The invention accordingly comprises the novel processes and steps of processes, specific embodiments of which are described hereinafter by way of example and in accordance with which we now prefer to practice the invention.

We have found in accordance with out invention that it is possible to subject the methyl acetate to hydrolysis in the presence of a catalyst under superatmospheric pressure at a temperature approximating but lower than the boiling point. In order to carry out this hydrolysis we subject aqueous methyl acetate to which has been added a small proportion, for example about 1% by weight (or a somewhat higher or lower proportion) of a catalyst such as sulphuric acid, to heat under superatmospheric pressure bringing the mixture of methyl acetate, sulphuric acid and water to a temperature approximating the boiling point but below such boiling point at the pressure selected. For example we have found it suitable to work at about 100° C. under a pressure of 3 kgs./cm.² above atmospheric pressure. Or we may operate at about 115° C. under a pressure of 6 kgs./cm.² above atmospheric pressure. This process can with advantage be carried out continuously; in that case, methyl acetate in admixture with water and catalyst is passed through a zone in which prevail the pressure and temperature as defined above, the proportion of water with respect to ester being such that the ester is only partly hydrolyzed; in practice, we use 0.3 to 2 parts of water for one part of ester (by weight), the most favorable proportions being 1 to 1.2 parts of water for one part of ester. The time of residence in this zone is of about 10 to 45 minutes.

The reason why the ester should be only partly hydrolyzed is that total hydrolysis of the ester would require too long time. On the other hand the ester should nevertheless by hydrolyzed up to an extent sufficient for the operation to be commercially beneficial. In practice, we prefer that only 20% to 70% by weight of the ester be hydrolyzed, more particularly about 50%.

In accordance with out invention we conduct a process of distilling and refluxing a mixture of methyl acetate, methyl alcohol, acetic acid and aqueous mineral acid to separate an aqueous mixture of methyl acetate and methyl alcohol from the other ingredients. The other ingredients include the acetic acid and the aqueous mineral acid. We then proceed with distilling and scrubbing with water the vapors of the aqueous mixture of methyl acetate and methyl alcohol to separate the two last named compounds from one another. We then extract acetic acid to separate it from the mineral acid and distill the extract. As stated the mixture of methyl acetate, methyl alcohol, acetic acid and water containing the mineral acid such as sulphuric acid may be obtained from partial hydrolysis of an aqueous solution of methyl acetate, and more specifically the process of recovering acetic acid and methyl alcohol is carried out in the following manner:
(a) distilling the mixture while condensing part of the vapors and refluxing the condensate into the distilling column, thus obtaining at the top of the column methyl acetate and methyl alcohol vapors and, at the foot thereof, aqueous acetic acid; (b) scrubbing the last-named vapors with water, which carries off the methyl alcohol in the form of an aqueous solution thereof, thus separating the methyl alcohol from the methyl acetate; and (c) concentrating and dehydrating the aqueous acetic acid through extraction by means of a solvent which acts subsequently as a water-entrainer; then distilling the extract to recover acetic acid. In accordance with a feature of the invention, we use for carrying out step (c), at least a part of the non-hydrolyzed methyl acetate as the solvent and water-entrainer, preferably methyl acetate which has been separated in step (b). Instead of using methyl acetate separated in step (b) we may use some of the raw methyl acetate prior to hydrolysis.

In the drawing forming part of this application there is shown a diagrammatic view of apparatus in which the process of our invention may be carried out. A specific example of the process and an apparatus which may be used in carrying it out is described below. It to be understood that such example is illustrative and that the invention is not to be limited thereto except as indicated in the appended claims.

Referring now to the drawing: R is a reaction vessel or reactor, which is fed with methyl acetate from tank A and with a 2% aqueous solution of sulphuric acid from tank B, the methyl acetate and sulphuric acid being delivered in the proportion of about 125 parts by weight of sulphuric acid of the concentration mentioned to 100 parts by weight of methyl acetate. The temperature in reactor R is 100° C. and the pressure, 3 kgs./cm.$^2$. The liquid mixture of methyl acetate passes upward through pipe 26 which has a release valve therein for releasing the pressure prevailing in reactor R, and is sent into distilling column 1. From the foot of column 1 there flows a mixture of water, acetic acid and mineral acid, namely sulphuric acid, through the pipe 19, this mixture of acetic acid and mineral acid being substantially free from volatile products. At the top of column 1 vapors are evolved, part of which are condensed in condenser 8 and refluxed through pipe 9. The refluxed condensate prevents vapors of acetic acid from reaching the top of the column 1 and passing off with the methyl alcohol and methyl acetate. The remainder of the vapors pass through pipe 10 into the middle of distilling column 2 for the separation of methyl acetate and methyl alcohol.

Methyl acetate and methyl alcohol form an azeotropic mixture, but this is avoided and the ester is separated from the alcohol by supplying water to the head of column 2. This water, for example, is warm water flowing from the foot of column 3 mentioned below and introduced into the top of column 2 through pipe 11. This water causes a separation of the ester from the alcohol by "hydroselection." The ester concentrates at the top of the column 2 in the form of ester-water azeotrope. The vapors of methyl acetate leaving the top of column 2 are condensed in condenser 12, a portion of the condensate being refluxed through pipe 13 to the top of the column 2 while the remainder is returned to the reaction vessel R through pipe 14 together with fresh crude methyl acetate from tank A.

At the foot of column 2 there is obtained an aqueous solution of methyl alcohol which is introduced through pipe 15 into the middle part of distilling column 3. Distilling columns 1, 2 and 3 are each provided respectively with steam coils 1a, 2a and 3a for the purpose of providing heat to these columns. Methyl alcohol leaves column 3 at the top thereof through pipe 3b and is condensed in condenser 16, a portion of the condensate being refluxed through pipe 17 while the remainder is collected at 18.

The aqueous acetic acid obtained at the foot of column 1 along with the sulphuric acid is introduced through pipe 19 into extracting column 4 in which it flows downward countercurrently with respect to a solvent consisting of a mixture of methyl acetate and cyclohexane containing 10–25% by weight of cyclohexane. Cyclohexane is introduced into the apparatus at the beginning of the operation through valved pipe 27. The water freed from acetic acid but containing the sulphuric acid and traces of methyl acetate is returned through pipe 20 from the bottom of extracting column 4 to the inlet of the reactor R. In this manner the sulphuric acid is returned continuously to the hydrolysis step and accordingly describes a cycle.

Finally the solvent carrying off the acetic acid from extracting column 4 is introduced through pipe 21 into distilling column 5 at the foot of which anhydrous acetic acid is collected through pipe 25. Column 5 has a steam coil for heating same designated as 5a. At the top of column 5 a mixture of methyl acetate, cyclohexane and water is obtained which is condensed in condenser 22. The condensate is then separated in decanting device 6. The aqueous lower layer is returned from the decanting device to the inlet of reaction vessel R through pipe 23 while the upper layer of solvent is returned through pipe 24 to extracting column 4 in which it is used again for the extraction of further acetic acid.

It is not necessary to further treat the residual water that flows out of column 4 through pipe 20 when methyl acetate is used as the solvent. In addition if methyl acetate is partly hydrolyzed in the extracting column under the action of the sulphuric acid there present, this hydrolysis is not detrimental. On the other hand if another ester than methyl acetate were employed as the solvent in this step in column 4 the apparatus would thereupon become contaminated with an alcohol other than methyl alcohol and it would be necessary to re-esterify it in another apparatus.

In addition it is pointed out that cyclohexane is very slightly soluble in water saturated with methyl acetate so that small quantities of cyclohexane flow into reaction vessel R. This does not interfere with the reaction. However it is obvious that after leaving the reaction vessel the cyclohexane will go successively to the top of column 1, then to the top of column 2. Pipe 7 is provided to recover it in part. This pipe returns such cyclohexane and methyl acetate to the lower part of column 4. It is pointed out that it is necessary to compensate by this means for the methyl acetate loss which occurs by the return of the methyl acetate through pipe 20 to the reactor R.

The adding of a substance such as cyclohexane to a solvent such as methyl acetate in connection with the recovery of acetic acid from aqueous solutions thereof is not claimed herein as it is not the invention of the present applicants. Such a process is disclosed and claimed in the copending application of Maurice Mention and Louis Alhéritière, Serial No. 220,292, filed April 10, 1951.

What we claim is:

1. A process which comprises partially hydrolyzing under pressure methyl acetate in the presence of a strong mineral acid, at a temperature approximating, but below, the boiling point of the mixture at the pressure employed, to produce a mixture of methyl acetate, acetic acid, methyl alcohol and aqueous mineral acid, subjecting the last-named mixture as such to distillation and refluxing, to separate an aqueous mixture of methyl acetate and methyl alcohol from the other ingredients, subjecting said aqueous mixture to extractive distillation in a distilling column with water fed to the top section of the column to scrub the vapors and separate methyl alcohol from methyl acetate, distilling methyl alcohol to separate it from water, extracting the aqueous acetic acid with a solvent serving as a water-entrainer and comprising methyl acetate, distilling the acetic acid so extracted to concentrate and dehydrate same, and recycling the aqueous mineral acid to the hydrolyzing step.

2. A process in accordance with claim 1, in which the methyl acetate in the solvent serving as a water-entrainer is taken from the methyl acetate separated from the methyl alcohol after scrubbing of the vapors of the aqueous mixture thereof.

3. A process in accordance with claim 1, in which the mixture is passed continuously through a zone in which the pressure and temperature mentioned exist, the time of residence of the mixture in said zone being about 10 to about 45 minutes and the proportion of water with respect to ester being such that about 20% to 70% of the ester is hydrolyzed.

4. A process in accordance with claim 3, in which the proportion of water with respect to ester is such that about 50% of the ester is hydrolyzed.

MAURICE MENTION.
JULES MERCIER.

References Cited in the file of this patent

UNITED STATES PATENTS

| Number | Name | Date |
|---|---|---|
| 1,647,676 | Retze | Nov. 1, 1927 |
| 1,914,134 | Krchma | June 13, 1933 |
| 2,165,438 | Allquist | July 11, 1939 |
| 2,290,157 | Bright | July 21, 1942 |
| 2,391,219 | Bartlett | Dec. 18, 1945 |

FOREIGN PATENTS

| Number | Country | Date |
|---|---|---|
| 663,425 | France | Aug. 21, 1929 |
| 890,640 | France | Feb. 14, 1944 |